United States Patent [19]

Pollak et al.

[11] Patent Number: 4,947,643
[45] Date of Patent: Aug. 14, 1990

[54] ACTIVE GEOMETRY CONTROL SYSTEM FOR GAS TURBINE ENGINES

[75] Inventors: Robert R. Pollak, North Palm Beach; Syed J. Khalid, Palm Beach Gardens; Juan A. Marcos, Jupiter, all of Fla.

[73] Assignee: United Technologies Corporation, Hartford, Conn.

[21] Appl. No.: 246,765

[22] Filed: Sep. 20, 1988

[51] Int. Cl.$^5$ .......................... F02K 1/17; F02C 9/54
[52] U.S. Cl. ...................... 60/236; 60/39.27
[58] Field of Search ............ 60/235, 236, 239, 240, 60/39.161, 39.27, 39.29

[56] References Cited

U.S. PATENT DOCUMENTS

| | | | |
|---|---|---|---|
| 2,931,168 | 4/1960 | Alexander et al. | 60/239 |
| 3,041,822 | 7/1962 | Emburee | 60/239 |
| 3,060,680 | 10/1962 | Wilde et al. | 60/239 |
| 3,523,423 | 8/1970 | Young | 60/239 |
| 3,656,301 | 4/1972 | Katz | 60/236 |
| 3,747,344 | 7/1973 | Porter et al. | 60/242 |
| 4,159,625 | 7/1979 | Xeur | 60/204 |
| 4,184,327 | 1/1980 | Cornett et al. | 60/240 |
| 4,244,181 | 1/1981 | Wihier et al. | 60/39.161 |
| 4,467,600 | 8/1984 | Peikerk | 60/204 |
| 4,809,500 | 3/1989 | Roberts | 60/235 |

*Primary Examiner*—Louis J. Casaregola
*Attorney, Agent, or Firm*—McCormick, Paulding & Huber

[57] ABSTRACT

An active control system for use in gas turbine engines synchronizes exhaust nozzle area and burner fuel flow together with pas path variable engine parameters, such as fan variable vane and high compressor variable vane positions. As a result, extremely fast thrust transients are possible with optimized compression system stability, since fan and compressor rotor speeds are held high, allowing total engine power to be controlled by air flow and fuel flows directly.

10 Claims, 6 Drawing Sheets

ACTIVE GEOMETRY CONTROL SYSTEM FOR GAS TURBINE ENGINES

This invention was made under a Government contract and the Government has rights therein.

CROSS-REFERENCE TO RELATED APPLICATIONS

The subject matter hereof is partially disclosed, and some is claimed, in the commonly owned, copending U.S. patent application, Ser. Nos. 246,728 and 246,730, filed on even date herewith entitled "Control of High Compressor Vanes and Fuel For a Gas Turbine Engine" and "Control of Low Compressor Vanes and Fuel For a Gas Turbine Engine", respectively.

TECHNICAL FIELD

This invention relates to gas turbine aircraft engines, more particularly to engine control systems.

BACKGROUND OF THE INVENTION

Gas turbine engine control systems are well known in the art. These control systems are specially configured for use with a particular civilian or military aircraft application. For example, fighter aircraft must be capable of undergoing violent maneuvers which require changes in engine power with corresponding changes in engine thrust to severely accelerate or decelerate the aircraft. To perform these maneuvers, the pilot must execute sudden power lever movements usually referred to as "bodies", "chops" or "snaps". These power lever movements produce extreme engine speed, temperature and air flow excursions. Engine controllers for fighter aircraft must provide maximum engine response as quickly as possible.

An example of an engine used in fighter aircraft is the F100 engine manufactured by Pratt and Whitney Aircraft, a division of The United Technologies Corporation, the assignee of the present application. The F100 engine is a multiple spool axial flow turbine power plant having a fan jet engine configuration. The engine is characterized by a fan or low compressor coaxial with a high compressor rotor. Both the fan and high compressor have vanes whose angles are adjustable while the rotor blades are moving. The engine also has a variable area exhaust nozzle.

During operation, the rotor speeds of the fan and high pressure compressor rotors will vary from a high speed (intermediate or military power) to a low speed (part power or idle power). To accomplish the dramatic changes in engine power output, not only are the fan and high compressor vanes changing position with the speed of the respective rotor, the variable exhaust nozzle is also changing area, as the amount of fuel provided to the engine combustor varies from a high value to a low value. For example, a "chop" in desired thrust would schedule the engine to reduce power from a military power condition, e.g. 12,000 lbs. of thrust, to 4,000 lbs. of thrust by reducing the amount of fuel to the combuster of the engine and increasing the exhaust nozzle area. The fan and high compressor rotor speeds, turbine temperature and air flow will decrease in accordance with the corresponding thrust profile. Similarly, there is a significant increase in rotor speed, temperature and air flow when the power plant undergoes a transition from part power to military power.

With existing jet engine controls there is a "bootstrap" process which occurs when there is a request for more or less power. Known controllers initiate a request for more or less power by increasing or decreasing fuel flow in response to the change in throttle power lever angle (PLA). The change in fuel flow produces changes in power via combustor exit conditions. Only in response to these changes are the engine spool speeds changed and, in turn, is the compression system geometry adjusted, such as the position of the fan variable vanes (FVV), high compressor variable vanes (HCVV) and exhaust jet nozzle area (AJ). In transient power situations the result is lessened engine flexibility and slower engine response. In addition, systems which control the gas path variable engine parameters in response to changes in fuel flow are characterized by non-optimum engine performance, as evidenced by higher fuel consumption and potential compressor system instability.

SUMMARY OF THE INVENTION

An object of the present invention is to provide an active geometry control system for gas turbine engines which uses a single parameter to set overall engine thrust as a function of total engine air flow and pressure ratio.

Another object of the present invention is to provide an active geometry control system for gas turbine engines having synchronous scheduling of combustor fuel flow with gas path variable parameters by means of variable compression system geometry parameters.

Another object of the present invention is to provide an active geometry control system that modulates compressor system air flow while minimizing excursions of engine rotor speeds.

According to the present invention, a system for controlling power from an aircraft engine having gas path variable engine components, variable area exhaust nozzle, and a burner for generating hot exhaust gases, the system includes a means for receiving aircraft parameter signals, a means for receiving engine parameter signals, including signals indicative of gas path variable engine components exhaust area, and fuel flow to the burner. A controller is included which receives the parameter signals and provides, in response through signals indicative of selected engine power level controls, signals to the engine that select the magnitude of the burner fuel flow and the exhaust nozzle area synchronously with the magnitude of the gas path variable engine components.

DESCRIPTION OF THE PREFERRED EMBODIMENT

Figure 1:
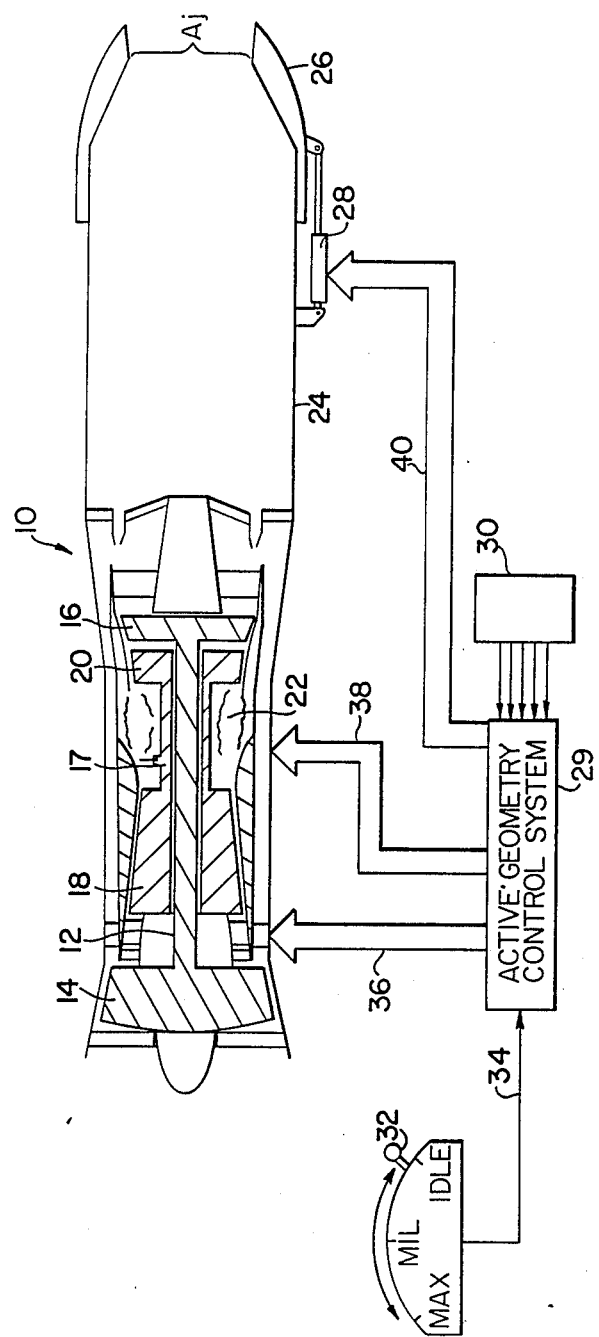
FIG. 1 is a simplified schematic illustration of a gas turbine engine employing an active geometry control system provided according to the present invention.

Referring now to FIG. 1 there is illustrated in schematic form a jet engine 10 which is of a conventional twin spool type having an $N_1$ spool 12 including a fan 14 driven by a low pressure turbine 16 and an $N_2$ spool 17 having a high pressure compressor 18 and high pressure turbine 20. The high pressure compressor and high pressure turbines are sometimes referred to as the gas generator or engine core. A conventional burner 22, disposed between the compressor exit and turbine inlet serves to heat and accelerate the engine's working medium in order to energize the gas sufficiently to power the turbines and generate thrust. The high pressure spool and low pressure spool are not mechanically connected to each other but rotate independently. The engine also includes an augmentor 24 receiving discharged gas from the low turbine. The gas exits the engine via an exhaust nozzle 26. As is conventional, an actuator 28 is used to control the position of the exhaust nozzle and thereby vary the area (AJ) of the exhaust discharge opening.

Also illustrated in FIG. 1 is an active geometry control system 29, described hereinafter. As is conventional, the control system receives signals from various components and sensors in the engine 2nd aircraft, indicated schematically at 30. Engine parameters are used by the control system to generate command signals to control burner fuel flow and the area of the exhaust nozzle in accordance with predetermined schedules selected to achieve optimum engine operation over the engine's flight envelope. As detailed hereinafter, an active geometry control system provided according to the present invention is characterized by the control of burner fuel flow and exhaust nozzle area which is synchronous with the control of variable gas path parameters including fan and high compressor variable vane position.

Both the fan and high compressor have a plurality of vanes whose position are adjustable from closed to fully open. As is well known, these variable vanes can be adjusted according to preprogrammed schedules which will optimize the power and response of the engine. The pilot controls engine power output by varying the position or angle of throttle lever 32. The angle of the throttle lever as well as the rate of change of throttle lever angle is determinative of the amount of power supplied by the engine. Signals indicative thereof are provided on lines 34 to the controller where the power lever angle and the rate of change of power lever angle can be determined. Signals are provided to the jet engine for the system 29 to control engine parameters as illustrated by lines 36, 38 and 40.

Figure 2:
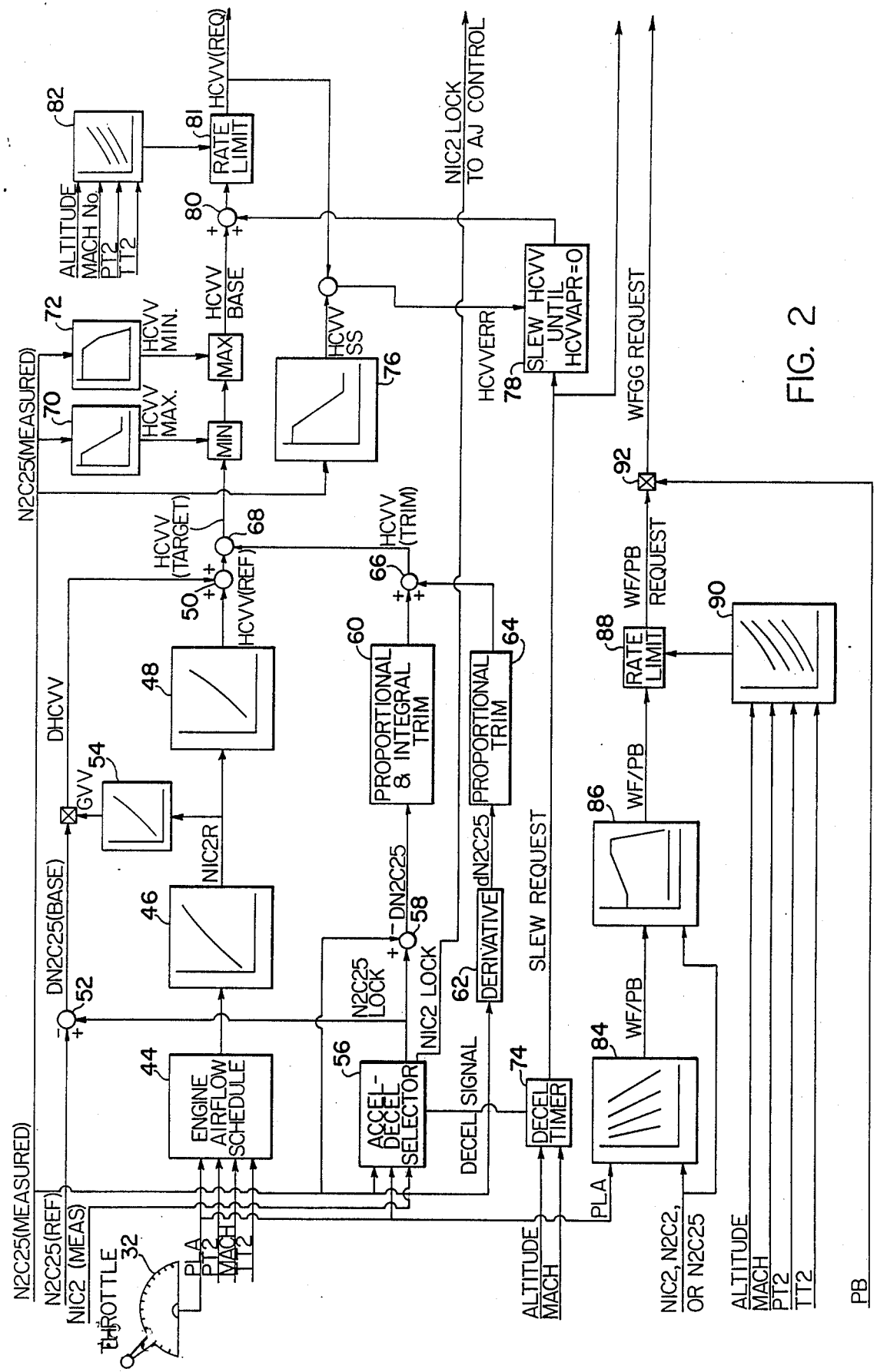
FIG. 2 is a detailed schematic illustration of a portion of the active geometry control system of FIG. 1.

Referring now to FIG. 2, there is a detailed schematic illustration of the active geometry control system of FIG. 1. Modern aircraft employ an electronic engine control which monitors aircraft parameters and which is preprogrammed with a plurality of parameter schedules for selecting fuel flow and other engine parameters in accordance therewith. Although it is preferable to embody the present invention in a digital electronic form, those skilled in the art will note that the present invention can alternately be embodied in analog electronic, hydraulic or mechanical means with appropriate conventional changes in hardware and software.

In the best mode, embodiment of the control system is digital and includes such hardware and software as is needed to accomplish the functions detailed herein. Parameter sensors, digital-to-analog and analog-to-digital converters and conventional computer means which may be required are not illustrated for the sake of clarity. Also in the control system of FIG. 2, a plurality of function generators have been diagramatically shown with unlabeled axes for purposes of clarity. As is conventional, the ordinate parameter for each function generator is labeled after its symbol, while the abscissa parameters precede it. Further, the several parameters illustrated would be recognized by those skilled in the art to correspond to well known parameters which may be corrected (C) for certain standard positions (2,2.5) within the engine. Therefore, $N_2C_{2.5}$ (meas) represent the measured value of $N_2$ spool speed corrected for position 2.5 in the engine. A glossary of terms is provided below.

| GLOSSARY OF TERMS | |
|---|---|
| AJ | jet nozzle area |
| AJT | transient area adjustment |
| PLA | power lever angle |
| PT2 | signal indicative of engine inlet pressure |
| TT2 | engine inlet temperature |
| EPR | engine pressure ratio |
| $N_1C_2$ | fan rotor corrected speed at station 2 |
| $DN_1C_2$ | differential fan rotor corrected speed (error) |
| $DAJ_{1,2}$ | differential exhaust nozzle area |
| $P_BMIN$ | minimum burner pressure |
| PB | burner pressure |
| DPB | burner pressure error |
| FVV | fan variable vane position |
| HCVV | high compressor variable vane position |
| $N_1C_2R$ | fan rotor corrected speed request |
| HCVVREF | high compressor variable vane position (Ref) |
| DHCVV | differential corrected high compressor variable vane position |
| HCVV | final requested high compressor variable vane position (Ref) |
| $DN_2C_{2.5}$ | differential high compressor corrected speed (error) |
| GVV | gain |
| $dN_2C_{2.5}$ | derivative corrected high compressor speed |
| $WF_{gg}$ | fuel flow request |
| WF/PB | fuel flow ratio |
| $N_1$ | low compressor rotor speed |
| $N_2$ | high compressor rotor speed |
| 2 | engine inlet station |
| 2.5 | fan discharge station |
| 3 | compressor discharge station |
| $N_2C_{2.5}$ | high compressor speed corrected at station 2.5 |

As detailed hereinafter, the active geometry control system provided according to the present invention is characterized by independently coordinated use of main combustor fuel flow with selected geometries of variable gas path elements (e.g. fan and high compressor variable vanes) to optimize engine performance. Consequently, thrust response and compression system stability of turbo jet and turbo fan gas turbine engines are improved. As indicated hereinabove, known jet engine control systems would provide fuel to the combustor in response to changes in the power lever or throttle angle initiated by the pilot. The increased fuel would produce changes in the engine dynamics, requiring changes in fan or low compressor variable vane position and high compressor variable vane position in addition to the jet nozzle area. The process of increasing (or decreasing) fuel flow before rotor speeds and hence, any gas path elements can sufficiently react is known to those skilled in the art as "boot strapping". This process limits the rate at which power transients can be produced by the jet engine.

Figure 3:
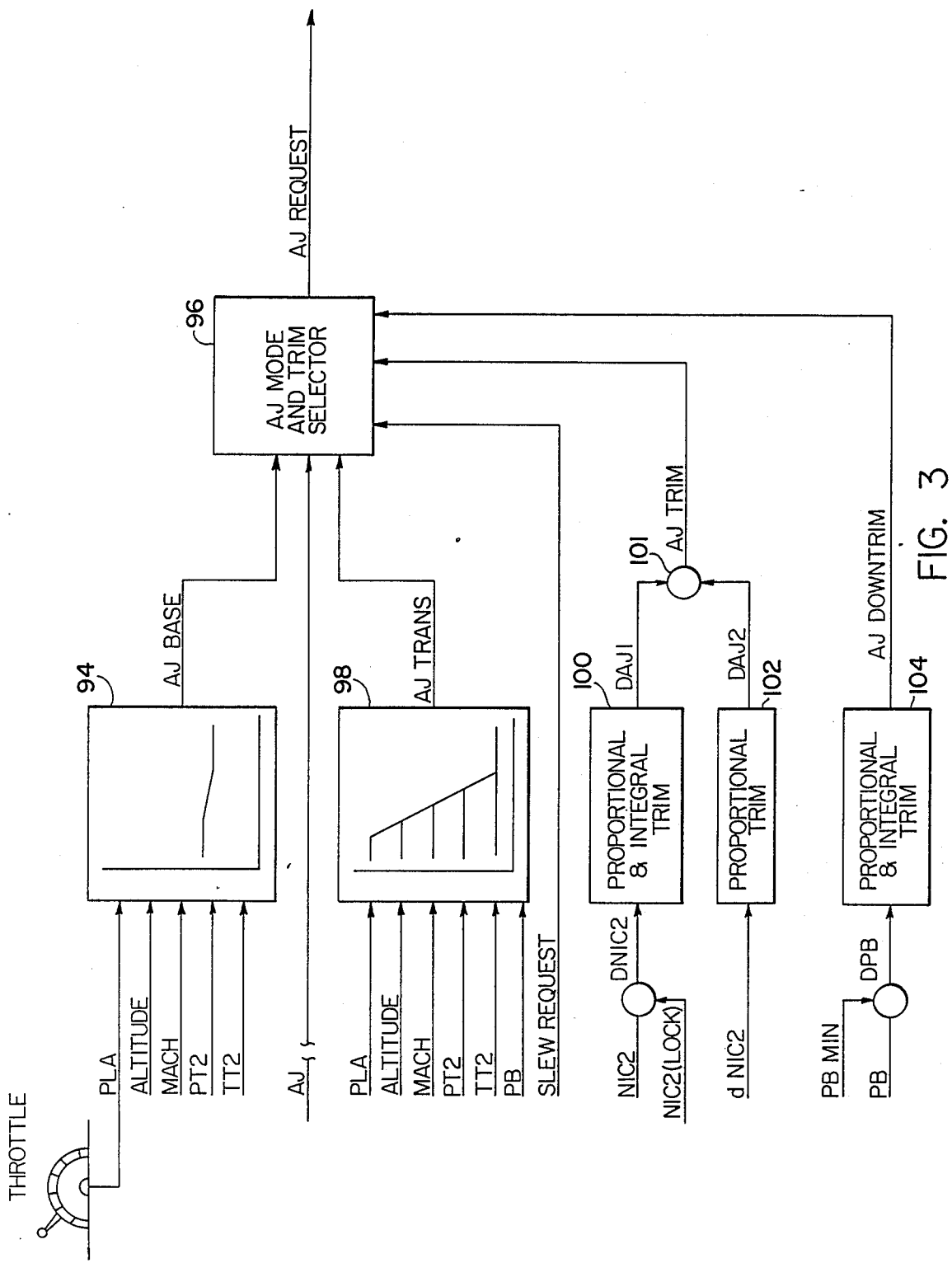
FIG. 3 is a simplified block diagram of a second portion of the controller of FIG. 1.
Figure 4:
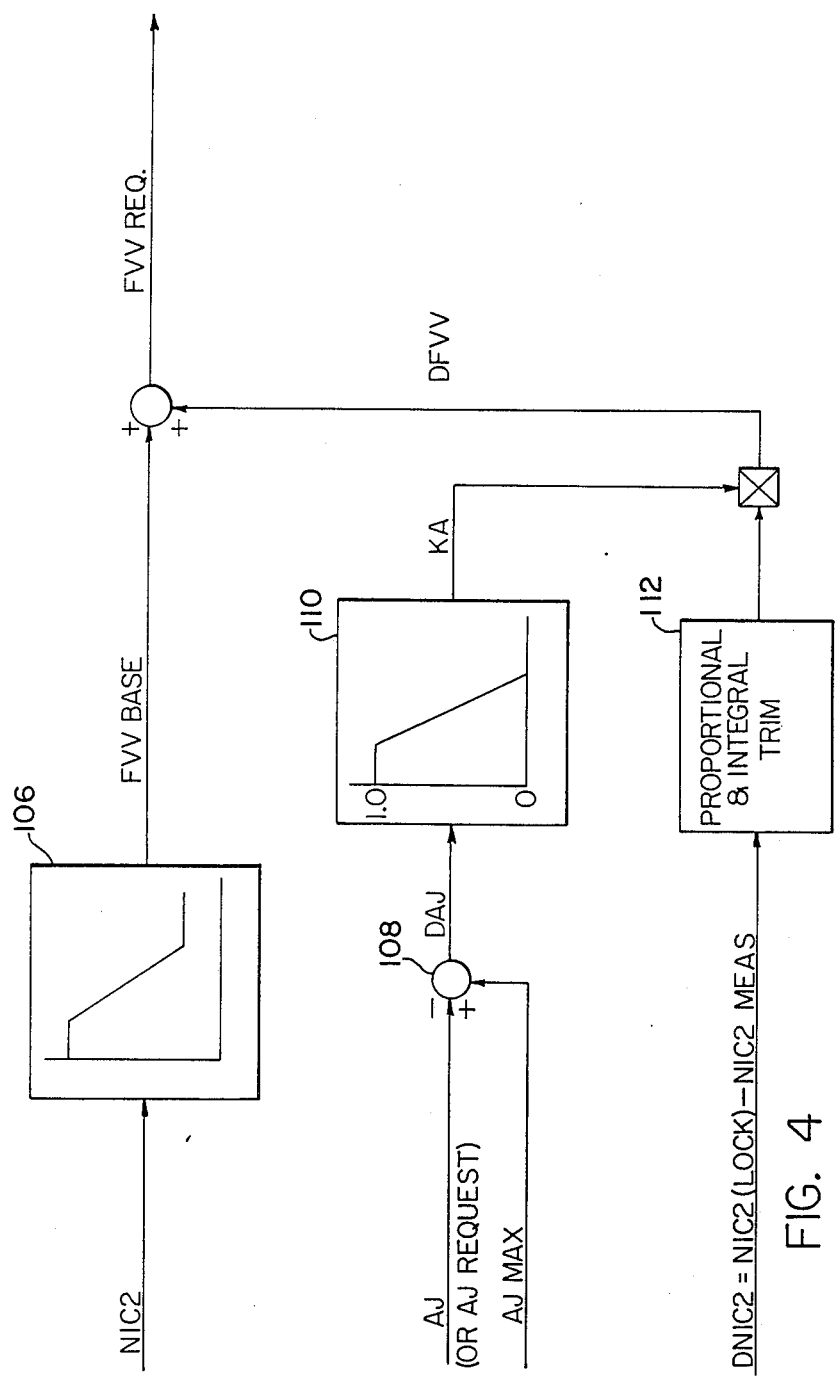
FIG. 4 is a simplified block diagram of a third portion of the controller of FIG. 1.

However, with the active geometry control system provided according to the present invention, fan and high compressor variable vane position, jet nozzle area and fuel flow are all synchronously controlled in response to a power request. The system anticipates the response of the engine such that either or both compression system air flows are modulated with reduced excursion or spool speeds. FIG. 2 illustrates the portion of the control system which generates control signals for both the actuators which control the high compressor variable vane position and the fuel flow in the combustor. FIG. 3 is seen to detail that portion of the control system which generates signals for adjusting the area of the exhaust gas nozzle. FIG. 4 schematically details that portion of the control system which generates fan variable vane position control signals.

In order to adjust the high compressor variable vane position, the control system must compute an engine air flow parameter value as well as determine whether the engine is accelerating or decelerating, and the magnitude thereof. Throttle or power lever 32 is the principal mechanism by which the aircraft pilot requests changes in engine power. Signals indicative of the power lever angle (PLA) are provided to engine airflow-schedule mechanism 44 which also receives a plurality of signals from the aircraft, including engine inlet pressure (PT2), airplane speed (Mach number) and engine inlet temperature (TT2). The scheduled value of engine airflow is received by function generator 46, which requests a corrected value of the $N_1$ spool speed ($N_1C_2R$).

Function generator 48 outputs a requested value of high compression variable vane position (HCVV(Ref)). The reference values (HCVV(Ref)) is summed at junction 50 with a differential value thereof (DHCVV) comprised of a corrected high compressor speed sensor ($DN_2C_{2.5}$(base)) generated at junction 52 from a reference value of corrected $N_2$ spool speed ($N_2C_{2.5}$(ref)) and a value of $N_2C_{2.5}$ measured just as the new power level was requested ($N_2C_{2.5}$(lock)). This corrected high compressor speed sensor value is converted by a gain variable vane (GVV) generator 54 as a function of $N_1C_2R$.

Acceleration/Deceleration selector 56 receives signals indicative of the power lever angle as well as the measured value of the corrected $N_2$ spool speed, and generates therefrom values of the $N_1$ and $N_2$ corrected spool speeds at the initiation of the power request ($N_2C_{2.5}$ lock and $N_1C_2$ lock). The lock value of $N_2C_{2.5}$ is summed at junction 58 with the measured, corrected $N_2$ spool speed to produce a differential $N_2C_{2.5}$ value ($DN_2C_{2.5}$). This signal is provided to proportional and integral trim circuitry 60 which generates a correction signal for HCVV in a conventional manner. Also included is circuitry for detecting very rapid changes in the measured corrected $N_2$ spool speed. Derivative circuitry 62 receives the measured corrected $N_2$ spool speed and outputs a derivative value ($dN_2C_{2.5}$) which is provided to proportional trim circuitry 64 whose output signal of HCVV is configured in conventional, proportional control manner. The output signals of both the proportional trim circuitry 64 and proportional and integral trim circuitry 60 are provided to junction 66, where the signals are summed producing a trim or correction signal for the high compressor variable vane position (HCVV(Trim)). This signal is provided to junction 68 where it is summed with (HCVV ref) signal producing a target value of the high compressor variable vane position (HCVV (target)).

The control system provided according to the present invention compares the target value of the high compressor variable vane position with minimum and maximum allowable values determined by function generators 70 and 72. The value of the target high compressor variable vane position signal is adjusted accordingly if the target value exceeds the upper or lower bounds. This is the adjusted or base value of the high compressor variable vane position signal (HCVV) base.

The control system of FIG. 1 is also characterized by slew request circuitry, including a deceleration timer 74, which receives signals indicative of the airplane's altitude and speed (Mach number) as well as an enable signal from Accel/Decel selector circuitry 56 that indicates the elapsed time from the initiation of the power lever command signal. As detailed hereinafter, the control system of FIG. 1 will automatically reconfigure the engine parameters to be in a steady state mode if the deceleration timer circuitry determines that the power level angle has not changed in a preset period (e.g. 20 seconds).

Function generator 76 receives the $N_2C_{2.5}$ (meas) signal and provides a signal corresponding to the high compressor variable vane position at steady state (HCVVSS). This signal is summed with a high compressor variable vane position request signal (HCVV(req)) to generate a high compressor variable vane error signal (HCVV(err)). In response to a slew request signal, slew error circuitry 78 provides the HCVVERR signal to junction 80 where it is summed with the HCVV(base) signal. As detailed hereinafter, the slew request circuitry modifies the HCVV(req) signal in dependence on the time elapsed from the initiation of a change in power level angle signal. If the throttle has been moved within a selected time period (e.g. 20 seconds) the engine is considered in a transient condition and the HCVV(base) signal is adjusted accordingly. At the termination of the time period the HCVV(req) signal is modified by slew error circuitry 78 to slew the high compressor variable vane position back to the scheduled steady state position provided by function generator 76 and thereby reduce $N_2$ rotor speed. Rate limit circuitry 81 receives the corrected HCVV (base) signal and compares the rate of change of that signal to preselected rate limits scheduled by function generator 82 from the plane's altitude, speed, engine inlet temperature and fan pressure ratio. The controller outputs a HCVV request signal to the high compressor vane actuators.

A measured corrected value of the $N_1$ or $N_2$ spool speed is received by fuel flow circuitry 84, 86 or, which, in conjunction with the magnitude of the power lever angle, schedules fuel flow-to-burner pressure ratio signal. Rate limiting circuitry 88 limits the fuel flow-to-burner pressure ratio request signal in accordance with function generator 90. The parameters used by the rate limit circuitry 88 are similar to those used by rate limit circuitry 82 in determining the limit of the high compressor variable vane request signal. A signal indicative of burner pressure is provided to junction 92 along with the fuel flow to burner mechanisms in the combustor (22, FIG. 1).

Referring now to FIG. 3, the control system of FIG. 1 includes circuitry for selecting the area of the exhaust jet nozzle. For nonafterburner operation, function generator 94 schedules a base value (AJ base) of the exhaust jet area as a function of power lever angle the airplane's altitude, speed, the engine inlet temperature and pressure. This signal is provided to a jet area mode and trim selector circuitry 96 which provides the AJ base in dependence on the engine transient or steady state mode. Circuitry 96 receives signals indicative of the steady state value of the nozzle area. A transient nozzle area adjustment signal (AJ(trans)) is scheduled by function generator 98 as a function of a core engine parameter, such as $P_b/P_2$ as well as some of the same parameters as used for the AJ(base) signal. The AJ(trans) signal is primarily responsible for holding the $N_1C_2$ signal to a high value during deceleration for a specified time as set by timer circuitry 74 in FIG. 2. The requested exhaust nozzle area is further modified at circuitry 96 by proportional and integral trim circuitry 100 and proportional trim circuitry 102. The $N_1C_2$ (lock) signal set by the accelerator/decelerator selector circuitry 56 in FIG. 2 is compared to the $N_1C_2$(meas), generating a $DN_1C_2$ signal from which the proportional and integral trim circuitry 100 generates a differential exhaust nozzle area signal, $DAJ_1$. The proportional trim circuitry 102 provides a second differential exhaust nozzle area signal ($DAJ_2$) that is a function of a derivative of the $N_1C_2$(meas) signal, $dN_1C_2$. Both $DAJ_1$ and $DAJ_2$ signals are summed at junction 101 (AJ trim) and provided to AJ mode and trim selected circuitry 96. The AJ(trim) and AJ(trans) signal values ultimately adjust the $N_1C_2$ signal value to the value of $N_1C_2$(lock).

In the event a minimum gas generator supply pressure, such as burner pressure (PB), is required for aircraft bleed, a second proportional and integral trim circuitry 104 is provided in the event that the burner pressure minimum cannot be supplied with an open nozzle at the operating value of $N_1C_2$. A differential burner pressure signal (DPB) is generated by comparing the minimum burner pressure value with the engines value. This signal is received by circuitry 104 and generates an exhaust area downtrim signal which revises the fan discharge pressure by closing the exhaust nozzle, which generates a corresponding rise in the burner pressure to the minimum required value. After a selected time (e.g. 20 seconds) the slew request circuitry configures all transient exhaust area trim signals to zero the provide optimum steady state performance. In the event that the lock value of $N_1$ spool speed ($N_1C_2$(lock)) is unattainable with an open exhaust nozzle, the system of FIG. 1 comprises a circuitry to close the fan variable value (FVV) to increase $N_1$ spool speed.

FIG. 4 is a simplified block diagram of that portion of the control system of FIG. 1 which generates a fan variable vane position request signal for the fan vane actuators. The function generator 106 receives signals indicative of the corrected measured $N_1$ spool speed ($N_1C_2$) and schedules therefrom a base value of the fan variable vane position signal. Signals indicative of the exhaust nozzle area as well as the maximum allowed exhaust nozzle area are received at junction 108. Function generator 110 outputs a trim authority index which is slewed from a value of zero to one, the zero value corresponding to zero FVV position trim. The circuitry insures that both the exhaust area and fan variable position trims will not be fully active at the same time to avoid possible unstable interactions. A differential value of the corrected measured $N_1$ spool speed $DN_1C_2$ that generated from the difference between the $N_1C_2$ lock signal value and the measured corrected $N_1$ spool speed ($N_1C_2$(meas)) is provided to a proportional and integral trim circuitry 112 which, when summed with the trim authority index signal and the fan variable vane base signal, comprises the fan variable vane position request signal.

The system is configured such that as the exhaust nozzle is slewed to the steady state position or as the exhaust nozzle closes during a reacceleration, the differential fan variable vane position signal value (FVV) is automatically trimmed to zero since the trim authority value is slewed to zero as well. The synchronization of nozzle area together with fuel flow, fan variable vane position and high compressor variable vane position accomplished through the use of throttle input provides a unique method of controlling both fan and high compressor operating lines, and marks a point of departure of the present invention from the prior art. Extremely fast engine thrust transients are possible since fan or low compressor rotor speed is held high. The system described herein allows total engine power to be controlled by air flow via compression system geometry and by fuel flow. The improved thrust response and compression system stability of turbo jet engines and turbo fan gas turbine engines that is provided by the present invention can be seen by reference to FIG. 5.

Figure 5:
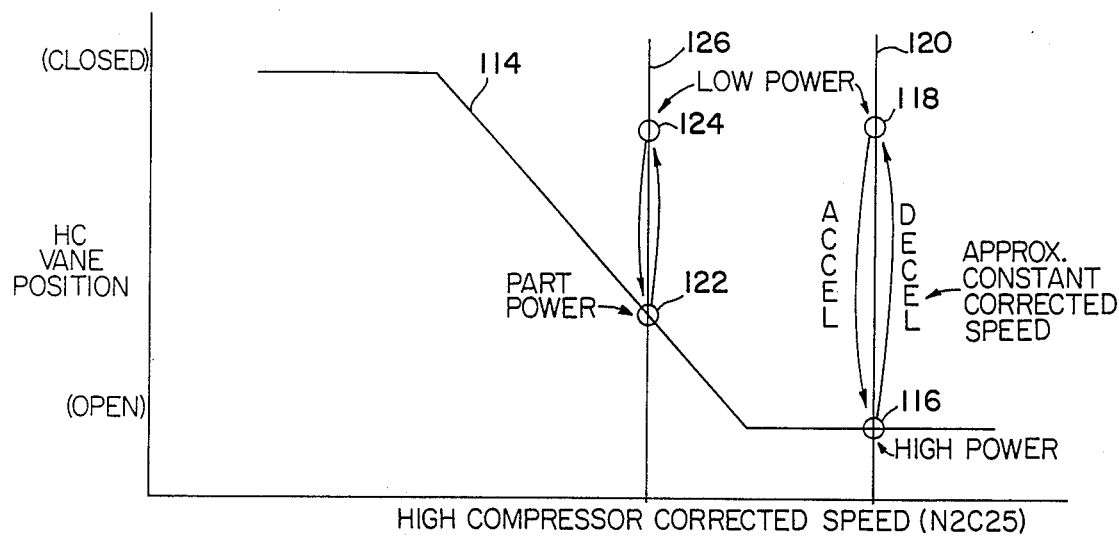
FIG. 5 is a diagrammatic illustration showing the relationship between high compressor vane position angle as a function of a high compressor corrected speed.

FIG. 5 is a diagrammatic illustration showing the steady state relationship between high compressor variable vane position (HCVV) and high compressor corrected speed ($N_2C_{2.5}$) detailed by curve 114. If the engine is operating at high power (Point 116) and receives a command to decelerate to a low power (Point 118) the system provided according to the present invention configures the engine so that the high compressor corrected speed essentially remains constant. Subsequent power request to accelerate or decelerate correspond to excursions along line 120. Consequently, rapid thrust response can be obtained from the engine without waiting for the speed of the high compressor fan to increase or decrease. This instantaneous response can also be obtained at other power levels, as indicated by points 122 and 124 which form an excursion line 126.

Figure 6:
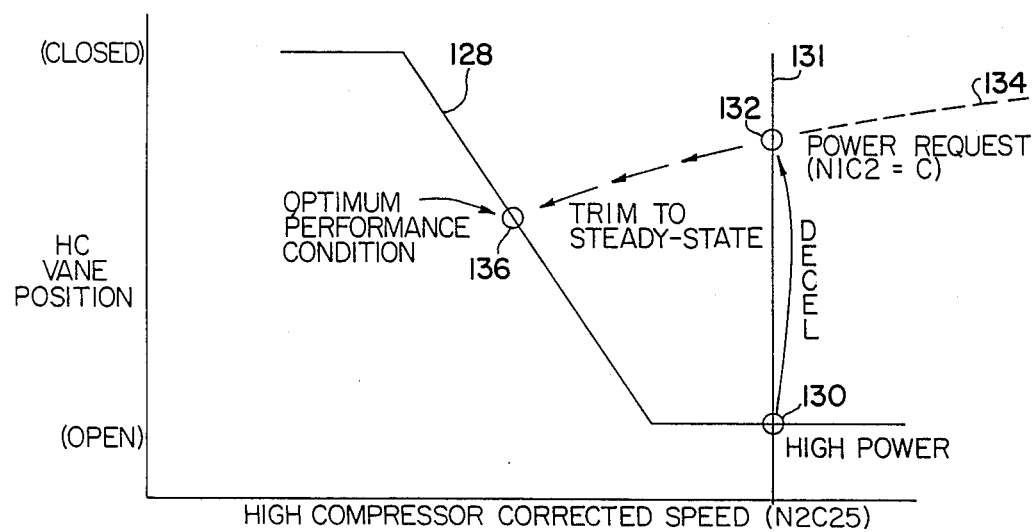
FIG. 6 is a diagrammatic illustration showing transient to steady state response of the control system of FIG. 1.

The system provided according to the present invention is also capable of monitoring the engine operating condition. If the engine is in a transient condition, i.e. the time elapsed from the previous power request is less than a preselected value, the system provides the optimum combination of transient rate and compression system aerodynamic stability. If, on the other hand, the engine is in a steady state condition, the system provides the optimum combination of engine performance such as specific fuel consumption and compression system aerodynamic stability by automatically trimming from the transient mode high compressor variable vane position to the steady state high compressor variable vane position, as illustrated in FIG. 6.

Curve 128 illustrates the relationship between high compressor variable vane position (HCVV) and high compressor corrected speed ($N_2C_{2.5}$) in a manner similar to that of FIG. 5. For example, if the engine is operating at high power (Point 130) and receives a command to decelerate the system locks the value of high compressor corrected speed ($N_2C_{2.5}$ lock) and adjusts the variable vane position to arrive along excursion line 131 at temporary set point 132. The temporary set point is also on curve 134 which corresponds to an operating line of constant power request ($N_1C_2$=constant). If the subsequent power request has not been received within the selected time period, the system trims the high compressor corrected speed and high compressor variable vane position to a value thereof corresponding to optimum engine performance (Point 136).

Figure 7:
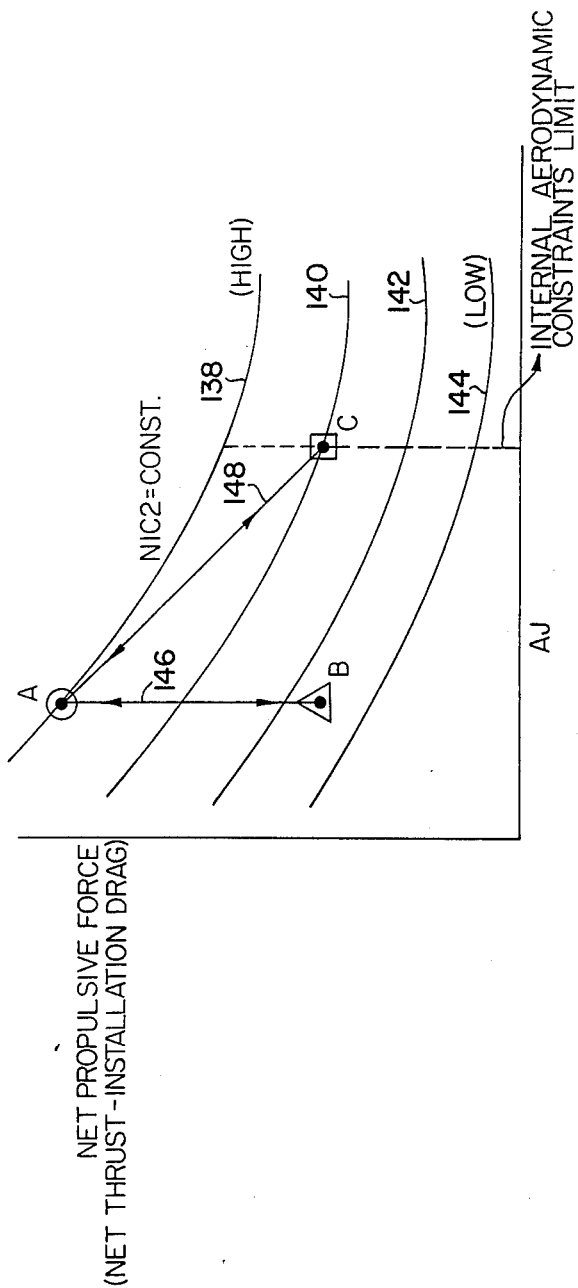
FIG. 7 is a diagrammatic illustration relating engine net thrust to exhaust area for selected fan rotor speeds.

An advantage of synchronous exhaust area scheduling provided according to the present invention compared with prior art control systems is depicted in FIG. 7. Curves 138, 140, 142 and 144 show net propulsive force as a function of exhaust area (AJ) with fan rotor corrected speed $N_1C_2$ at corresponding constant rotor speed values. With existing control systems, a deceleration from intermediate thrust (to low thrust (curve 146)) with little or no increase in exhaust area (AJ) results in a large reduction in low rotor ($N_1$) speed. Throttle response is adversely effected since the $N_1$ rotor speed must substantially increase in order for engine thrust to subsequently return to intermediate thrust (A). The large rotor speed excursion reduces the rotor low cycle fatigue (LCF) life drastically. Also, the smaller low power exhaust area reduces low speed compressor stability.

In contrast, an active geometry control system of the present invention schedules the exhaust area to open synchronously with other engine parameters. As indicated by curve 148, identical levels of low thrust can be obtained at higher low rotor ($N_1$) speeds (C). With a control system of the present invention rotor speeds at low thrust are higher than are obtained with an existing control systems since thrust level is not only dependent upon a reduction in rotor speed but rather is significantly effected by the larger exhaust area. Therefore an active geometry control system of the present invention provides dramatic improvement in thrust response because the engine spool speeds do not have to change significantly. The reduced rotor speed excursions correspondingly increase rotor low cycle fatigue (LCF) life. Moreover, the larger exhaust area at low thrust levels enhances compression systems stability. The larger exhaust area (AJ) reduces back pressure on the low pressure compressor by means of a bypass duct. Since the low pressure turbine is "un-choked" at low power, the corresponding reduction in nozzle pressure lowers the high pressure compressor operating line and hence enhances high compressor stability.

The active geometry control system provided by the present invention utilizes the concept of synchronous scheduling of all gas path variable parameters and gas generator (main engine combustor) fuel flow parameter. The synchronization of the fuel flow rate limit during acceleration and the HCVV (req) rate limit provides unique control and adjustment capability of high compressor operating line. If the engine reacceleration command is performed before the expiration of the period set by the deceleration timer and the control system has not permitted scheduling of steady state high compressor variable vane position extremely fast thrust accelerations are possible since power is not dependent upon significant rotor speed acceleration.

Similarly, although the invention has been shown and described with respect to a best mode embodiment thereof, it should be understood by those skilled in the art that various other changes, omissions and additions thereto may be made therein without departing from the spirit and scope of the invention. Specifically, the present invention is easily adapted for use with single spool engines with appropriate changes and conventional hardware and software. Also, although described with respect to a twin spool variable exhaust nozzle area engine, those skilled in the art will note that the control system of the present invention is easily adapted for use with engines having a fixed exhaust nozzle area.

We claim:

1. A system for controlling power from an engine in an aircraft, said engine having a compressor affixed to a spool driven by a turbine and having variable gas path components including variably positioned vanes having selectable values, and a burner for generating hot exhaust gases, said system comprising:
    means for receiving aircraft parameter signals;
    means for receiving signals indicative of the variable gas path component values and burner fuel flow;
    scheduling means responsive to said aircraft parameter signals and said gas path component value signals for anticipating contemporary values of said burner fuel flow and at least one variable gas path component; and
    control means responsive to said scheduling means, for providing, in response to signals indicative of a selected engine power level, signals to engine components to select a magnitude of said burner fuel flow synchronously with selected variable gas path component values.

2. The system of claim 1 wherein said variable gas path engine components include an engine fan having adjustably positioned vanes affixed to a spool driven by a low pressure turbine.

3. The system of claim 2 wherein said control means further comprises a timer and a means for distinguishing between steady state and transient engine operation, said control means for further providing signals to maintain low pressure turbine speed if, after a first engine power level signal is received, a second engine power level signal is received within a selected time period.

4. The apparatus of claim 3 wherein said control means further provides that, upon the expiration of said time period, said control means further provides signals to slew said engine to said steady state operation.

5. A system for controlling power from a twin spool gas turbine engine in an aircraft, said engine having a variable area exhaust nozzle, a fan with variably positioned vanes affixed to a spool driven by a low pressure turbine, a high pressure compressor having variably positioned vanes affixed to a spool driven by a high pressure turbine and a burner for generating hot exhaust gases, said system comprising:
    means for receiving parameter signals indicative of fan variable vane position (FVV), high pressure compressor variable vane position (HCVV) exhaust nozzle area (AJ) and burner fuel flow (WF); and
    control means receiving said parameter signals for providing, in response to signals indicative of a selected engine power level, signals to select a magnitude of fan and high pressure compressor speeds, burner fuel flow, and said exhaust nozzle area synchronously with a fan variable vane position and a high pressure compressor variable vane position.

6. The system of claim 5 wherein said control means further comprises a timer and a means for distinguishing between steady state and transient engine operation, said control means for further providing signals to maintain said compressor speed if, after a first engine power level signal is received, a second engine power level signal is received within a selected timer period.

7. The apparatus of claim 6 wherein said control means, after the expiration of said time period, further provides signals to slew said engine to steady state operation.

8. A system for providing signals to control an engine of an aircraft in response to a throttle signal, said engine having engine components and a burner for generating hot exhaust gases receiving a flow of fuel, an exhaust nozzle having an adjustable nozzle area, a high pressure compressor having adjustably positioned high pressure compressor vanes and a fan having adjustably positioned vanes, said control system comprising:

a high pressure compressor vane position control means for providing signals to control said high pressure compressor vane position;

fuel flow control means for providing signals to control the flow of fuel to said burner;

exhaust nozzle area control means for providing signals to control the exhaust nozzle area;

fan vane position control means for controlling said fan vane position;

wherein said high compressor vane position control means, said fuel flow control means, said exhaust nozzle area control means and said fan vane control means all simultaneously respond to said throttle signals.

9. The system according to claim 8 wherein said high pressure compressor vane position control means further comprises:

a range means responsive for constraining said high pressure compressor vane position signals within a minimum and maximum signals limits;

a trim means for providing corrected high pressure compressor vane position signals in accordance with an actual measured value of said high pressure compressor vane position; and a slew means responsive to a plurality of said engine component signals and signals indicative of a throttle signal constant within a selected time period, said slew means for providing signals to adjust said high pressure compressor vane position signal to a value corresponding to steady state engine operation.

10. The system of claim 1 wherein said aircraft further comprises an exhaust nozzle having a variable area and wherein said control means includes a means for controlling, in response to a received signal indicative of a selected power level, said exhaust nozzle area synchronously with said fuel flow and said selected variable gas path component values.

* * * * *